United States Patent [19]

Stenius et al.

[11] 4,425,261

[45] Jan. 10, 1984

[54] LIQUID SUSPENSION OF PARTICLES OF A METAL BELONGING TO THE PLATINUM GROUP AND A METHOD FOR THE MANUFACTURE OF SUCH A SUSPENSION

[75] Inventors: Per Stenius, Åkersberga; Jerzy Kizling; Magali Boutonnet, both of Täby, all of Sweden

[73] Assignee: Ytkemiska Institutet, Stockholm, Sweden

[21] Appl. No.: 320,967

[22] PCT Filed: Mar. 20, 1981

[86] PCT No.: PCT/SE81/00091

§ 371 Date: Nov. 5, 1981

§ 102(e) Date: Nov. 5, 1981

[87] PCT Pub. No.: WO81/02688

PCT Pub. Date: Oct. 1, 1981

[30] Foreign Application Priority Data

Mar. 24, 1980 [SE] Sweden ................................ 8002256

[51] Int. Cl.$^3$ ........................ B01J 13/00; B01J 23/40

[52] U.S. Cl. ................................... 502/339; 106/1.21; 252/313 R; 502/527

[58] Field of Search ............. 252/466 PT, 472, 313 R; 106/1.05, 1.11, 1.21

[56] References Cited

U.S. PATENT DOCUMENTS 3,835,066 9/1974 Davies et al. .................. 252/472 X
3,992,331 11/1976 Petrow et al. ...................... 252/472

FOREIGN PATENT DOCUMENTS 49-14448 8/1974 Japan ................................... 252/472

*Primary Examiner*—W. J. Shine
*Attorney, Agent, or Firm*—Burns, Doane, Swecker & Mathis

[57] ABSTRACT

A stable suspension of particles of a metal belonging to the platinum group consists of a microemulsion in which the particles are suspended. The suspension is prepared by dissolving a metal salt in a microemulsion, and reducing the salt to form a metal.

10 Claims, 3 Drawing Figures

LIQUID SUSPENSION OF PARTICLES OF A METAL BELONGING TO THE PLATINUM GROUP AND A METHOD FOR THE MANUFACTURE OF SUCH A SUSPENSION

TECHNICAL FIELD

The invention relates to a liquid suspension of particles of a metal belonging to the platinum group, and a method for the manufacture of such a suspension. The suspension of the invention is useful, for example, for manufacturing catalysts by depositing the metal particles on a carrier. The platinum group comprises ruthenium, rhodium, palladium, osmium, iridium, and platinum.

BACKGROUND ART

It is well known to prepare a suspension of platinum particles by reducing a platinum salt in an aqueous solution with hydrogen, for example. The platinum particles thus produced usually have an average size of at least 10 nm. The suspension, however, contains particles of various sizes, which is due to the fact that small particles have a tendency to unite to form bigger particles during the reduction. This is a disadvantage if the particles are to be used for catalytic purposes, because in this case small particles of approximately the same size are desired. It is another inconvenience that the suspension referred to is not quite stable. The particles have a tendency to settle.

DISCLOSURE OF INVENTION

The invention aims at eliminating said inconveniences. The suspension of the invention is characterized in that the liquid in which the metal particles are suspended consists of a microemulsion. The invention also relates to a method for manufacturing the suspension. The method is characterized by reducing a metal salt dissolved in a microemulsion.

Microemulsions have been known for about three decades. They consist of transparent, thermodynamically stable solutions of water and hydrocarbons, stabilized by a surfactant and, if desired, a second substance having a carbon chain of medium length and a polar end group, for example an aliphatic alcohol or a fatty acid. When used in the present invention the surfactant should be a non-ionic compound soluble in the hydrocarbon. The non-ionic compound shall not react with the reducing agent, meaning that it shall not contain double bonds or other characteristic groups which can be reduced (hydrated). The non-ionic compound shall not, for example, have aromatic groups in the hydrocarbon chain. This demand is met by non-ionic surfactants having been synthesized by reacting ethyleneoxide oligomers with high aliphatic alcohols so that they are bonded to the hydrocarbon chain with an ether bond, for example pentaethyleneglycol dodecylether and its homologs. The non-ionic compounds shall be insoluble in the solvents present in the microemulsion. These demands eliminate several classes of non-ionic surfactants, for example those having been formed by an esterification process, because they are reduced by, or form a precipitation with, hydrazine. We prefer to use polyethyleneglycol alkylethers, preferably containing 12–14 carbon atoms in the carbon chain, and 2–8 ethyleneoxide units in the polyethyleneglycol chain, for example tetraethyleneglycol dodecylether. The hydrocarbon shall not react chemically with the other components of the solution, or with the reducing agents, which are very reactive. This demand eliminates, for example, aromatic hydrocarbons which react with the reducing agents. The boiling temperature of the hydrocarbon shall not be close to the temperature at which the metal particles are precipitated, because this would result in a heavy evaporation of the hydrocarbon when gaseous reaction products leave the microemulsion. The following types of hydrocarbons are useful, fiz: Aliphatic non-cyclic hydrocarbons, for example the homologous series hexane-hexadecane, including branched isomers; aliphatic cyclic hydrocarbons, for example cyclohexane, methyl-cyclohexane, dimethyl-cyclohexanes and other cyclohexane derivatives, decahydronaphtalene. If the particles are to be deposited on a carrier it is preferred to use readily volatile alkanes (6–10 carbon atoms).

The metal salt shall be soluble in the microemulsion. The salt can be dissolved in a small quantity of water, and the aqueous solution thus produced may be mixed into a mixture of the surfactant and the hydrocarbon. Alternatively, the metal salt, which usually contains some crystal water, may be dissolved in the surfactant, and the solution may be mixed with the hydrocarbon, and additional water may finally be added, if desired. The metal compound may be any simple salt, or the corresponding acid, which is soluble in alcohols and/or water. When preparing a platinum suspension we prefer to use chloroplatinic acid, $H_2PtCl_6 \cdot xH_2O$, in which x is 6 at most. Other useful platinum compounds are sodiumhexachloroplatinate, $Na_2PtCl_6 \cdot 6H_2O$, sodiumhexabromoplatinate, $Na_2PtBr_6 \cdot 6H_2O$, and hexabromoplatinic acid, $H_2PtBr_6 \cdot 6H_2O$. Useful salts for the manufacture of suspensions of the other platinum group metals are, for example, palladium chloride, $PdCl_2$, sodiumhexachloropalladinate, $Na_2PdCl_6$, sodiumtetrachloropalladinate, $Na_2PdCl_4 \cdot 3H_2O$, ruthenium chloride, $RuCl_3 \cdot xH_2O$, irridium chloride, $IrCl_3 \cdot xH_2O$, hexachloroiridic acid, $H_2IrCl_6 \cdot xH_2O$, osmium tetraoxide, $OsO_4$, rhodium chloride, $RhCl_3 \cdot H_2O$.

DESCRIPTION OF THE INVENTION WITH REFERENCE TO THE DRAWINGS

Figure 1:
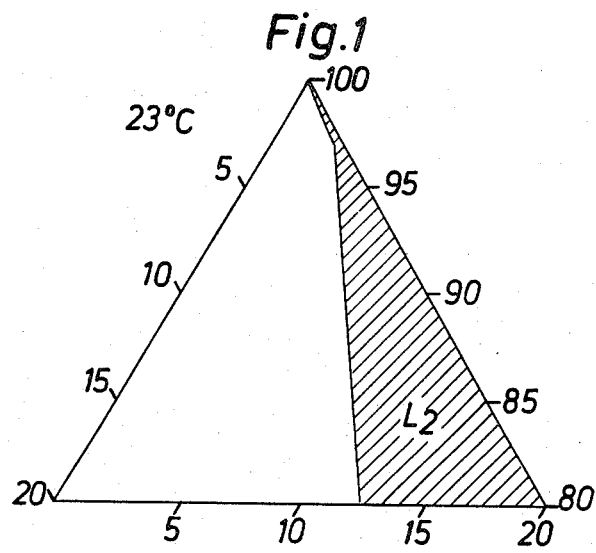
FIG. 1 shows a portion of a ternary diagram representing a microemulsion useful for making a suspension according to the invention.
Figure 2:
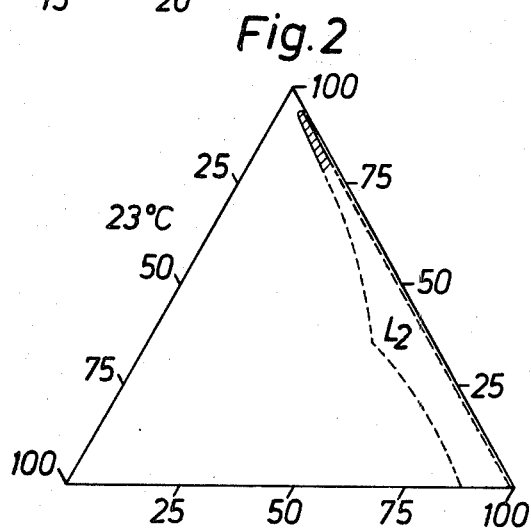
FIG. 2 shows a ternary diagram representing the microemulsion formed upon adding chloroplatinic acid and crystal water to the microemulsion represented by FIG. 1.
Figure 3:
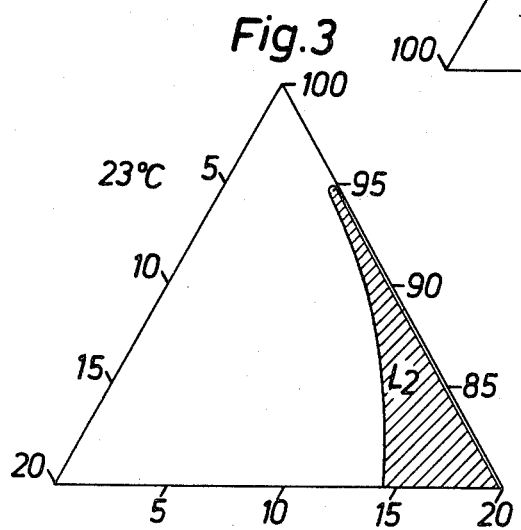
FIG. 3 shows part of the ternary diagram of FIG. 2 on a larger scale.

In the ternary diagram disclosed on FIG. 1 the upper corner of the triangle represents 100 percent by weight n-hexane, the lower right-hand corner represents 20 percent by weight pentaethyleneglycol dodecylether (PEGDE), and the lower left-hand corner represents 20 percent by weight water. The area $L_2$ represents a microemulsion, i.e. an isotropic, clear solution. The diagram is true for a temperature of 23° C. The area $L_2$ will have other shapes at other temperatures. A high percentage of surfactant makes the suspension difficult to handle, for example when using the metal particles as a catalyst. Therefore, we prefer to use only the upper, shaded portion of the area $L_2$, viz. the area in which the percentage of hydrocarbon in the microemulsion is above approximately 80 percent by weight and the percentage of PEGDE is below approximately 20 percent by weight. If an aqueous solution of chloroplatinic acid is added to the microemulsion of FIG. 1, for making a suspension according to the invention, the result will be a microemulsion represented by the diagram of FIG. 2. In the diagram of FIG. 2 the upper corner of the triangle represents 100 percent by weight n-hexane, the right-hand bottom corner represents 100 percent by weight pentaethyleneglycol dodecylether (PEGDE), and the left-hand bottom corner represents 100 percent by weight chloroplathinic acid plus crystal water. The diagram is true for a temperature of 23° C. The preferred portion of the area $L_2$ is shaded, and is disclosed on a larger scale by FIG. 3. A practical application of the diagram of FIG. 3 is illustrated by Example 1. The diagram of FIGS. 2 and 3 discloses that the smallest required percentage of PEGDE is approximately 5 percent by weight, and the smallest percentage of water + chloroplatinic acid that can be dissolved in the microemulsion is approximately 5 percent by weight. The finished suspension will have a maximum of stability if the weight ratio PEGDE to chloroplatinic acid is higher than 20. Ternary diagrams of the type illustrated on the drawing can be produced for each combination of hydrocarbon, surfactant, water, and metal salt. How to determine the boundary of the area $L_2$ has been disclosed by S. Friberg and I. Lapczynska: Progr. Colloid & Polymer Sci. 56, 16–20 (1975). Said article also gives some literature references on microemulsions.

The reducing agent should not produce any by-products which destroy the microemulsion or change the area in which it can exist. Therefore, substances producing insoluble solid or liquid reaction products, in addition to metal particles, are not suitable as reducing agents. We prefer to use hydrogen and hydrazine, $NH_2.NH_2$. Other useful reducing agents are aldehydes, for example formaldehyde HCHO.

If the metal salt is chloroplatinic acid, hydrogen chloride will be formed as a by-product. Consequently, the pH of the microemulsion will sink. Too low a pH will reduce the stability of the finished suspension. Therefore, we prefer to increase, before the reduction, the pH of the microemulsion to 9–10 by adding an aqueous solution of sodium hydroxide. This will result in a pH of at least 4 and preferably from 4–6 after the reduction, and the stability is not impaired. The reduction can be brought about in a simple way by adding the microemulsion, containing a dissolved metal salt, to a glass flask, adding the reducing agent in liquid or gaseous form to said flask, and shaking the flask for a few minutes at room temperature. By shaking vigorously the reduction time may be brought down to approximately ½ minute, which is favorable for the stability of the finished suspension. Without committing ourselves to any theory on the formation and growth of the metal crystals during the reduction, we believe that each "droplet" of water in the microemulsion acts as a crystallization nucleus during the reduction. Each "droplet" contains a plurality of molecules of the metal salt. The number of crystallization nuclei will be comparatively high, and the nuclei are separated from each other by a medium in which the reduced compound is insoluble. This is likely to mean that the formation of crystals can start simultaneously in each crystallization nucleus, and that the crystal growth can continue on each crystal as long as the microemulsion contains any unreduced metal salt. Consequently, the finished metal particles, each consisting of a single crystal, are likely to have approximately the same size, which is consistent with our experience. In fact, it is a characteristic feature of the suspension of the invention that the particle size lies within a narrow range. Usually a particle diameter is obtained having a standard deviation from the average diameter of less than ±10%. For example, when manufacturing a suspension of platinum particles in which 70% of the total number of particles had a size very close to 2.5 nm we found that only 12% of the particles had a size between 2.2 and 2.4 nm, and that only 18% of the particles had a size between 2.5 and 2.7 nm. The particle diameter was determined by means of electron microscopy. The particles were transferred to the diffraction grating by applying a thin layer of the suspension on the diffraction grating, and drying said thin layer. Smaller or bigger particles had not been formed at all. The electron microscopy disclosed tht the particles are crystalline. In general, it is preferred that the metal particles have a size of from 2 to 5 nm.

The suspension of the invention can be used for making a catalyst, either with the metal particles still being suspended in the solution, or by depositing the metal particles on a solid carrier, for example pumice or pulverulent $Al_2O_3$. The following depositing process is preferred, to prevent the metal particles from agglomerating to form bigger aggregates. The solid carrier is moistened with the suspension, and the liquid of the microemulsion is evaporated, preferably by exposing the moistened carrier to a reduced pressure. This process is repeated until the carrier possesses the desired density of the metal particles. The surfactant is now removed by rinsing the carrier repeatedly with ethanol. The carrier is finally dried at a reduced pressure.

EXAMPLE 1

This is an example of the manufacture of a suspension of platinum particles. The commercial surfactant Berol 050, a polyethyleneglycol alkylether, was freed of impurities by being distilled in vacuum. 0.52 grams of the purified surfactant was dissolved in 9.45 grams n-hexane. $H_2PtCl_6.xH_2O$ was added in a quantity equivalent with approximately $4 \times 10^{-4}$ grams metallic platinum per gram of solution. This means that the solution will contain approximately 0.3 grams water. Sodium hydroxide was added as a solution containing 1 mol per $dm^3$, in a quantity equivalent with the hydrochloric acid to be formed during the reduction. The platinum salt was now reduced by addition of hydrazine in excess while stirring. It is necessary to add the hydrazine in excess, because the compound is decomposed by solid platinum. The reduction goes fast at room temperature, and produces a stable suspension of platinum particles having a diameter of approximately 2.5±0.2 nm. The pH of the finished suspension is 5–6. The quantity of added hydrazine can be controlled by means of the fact that said final pH shall be attained.

EXAMPLE 2

This is an example of the manufacture of a suspension of palladium particles. 0.96 gram Berol 05 was purified by distillation in vacuum, and was dissolved in 8.6 grams n-hexane. 0.31 gram aqueous solution was added, containing 5 percent by weight $PdCl_2$. The palladium solution had been given a pH of 2–3 by the addition of 1 M hydrochloric acid. The quantity of palladium salt referred to corresponds to $9.4 \times 10^{-4}$ gram palladium per gram solution. Sodium hydroxide having a concentration of 1 mol per dm³ was added in a quantity adequate for neutralizing the hydrochloric acid expected to be formed during the reduction.

The palladium salt was now reduced by the addition of hydrazine. The hydrazine was added in an excess, so as to compensate for the hydrazine being decomposed by the formed solid palladium. The reduction runs fast at room temperature, and creates palladium particles having a diameter of approximately 5.0 nm. The final pH of the suspension was 5–6.

EXAMPLE 3

This is an example of the manufacture of a suspension of rhodium particles. 1.95 grams Berol 05 was purified by distillation in vacuum, and was mixed with 7.9 grams n-hexadecane. $RhCl_3.xH_2O$ was added in a quantity to produce a solution containing approximately $1.15 \times 10^{-3}$ gram Rh per gram solution. Sodium carbonate in a quantity equivalent to the hydrochloric acid expected to be formed during the reduction was dissolved in 0.15 gram water, and the solution was added to the mixture.

The rhodium salt was now reduced by hydrogen which was made to pass through the solution. The reduction was completed after approximately 2.5 hours at a temperature of 24° C. The rhodium particles of the finished suspension had a diameter of approximately 3.0 nm. The suspension had a pH of 5–6.

EXAMPLE 4

This is an example of the manufacture of a suspension of platinum particles, in which the microemulsion is based upon a cyclic aliphatic hydrocarbon.

A mixture was prepared consisting of 8.8 grams cyclohexane and 1.0 gram Berol 050. The Berol had been purified by vacuum distillation. To this mixture was added $H_2PtCl_6.xH_2O$ dissolved in 2.0 grams water. The quantity of the platinum salt was chosen to correspond to $2.2 \times 10^{-4}$ gram metallic platinum per gram solution.

Sodium hydroxide was added in a quantity adequate to neutralize the hydrochloric acid to be formed. The sodium hydroxide was added as a solution containing 1 mol per dm³.

The platinum salt was now reduced by the addition of an excess of hydrazine while stirring. It was necessary to add the hydrazine in an excess because it is decomposed by the formed solid platinum. The reaction runs fast at room temperature, and results in a stable suspension of platinum particles having a size of approximately $2.5 \pm 0.2$ nm. The pH of the suspension is 5–6, and the correct quantity of added hydrazine can be controlled by said pH being attained.

We claim:

1. A liquid suspension of particles of a metal belonging to the platinum group, characterized in that the liquid comprises a microemulsion and that the size of the metal particles does not deviate from the average by more than about 10%.

2. A suspension as claimed in claim 1, characterized in that the microemulsion comprises a hydrocarbon, a non-ionic surfactant, and water.

3. A suspension as claimed in claim 1, characterized in that the metal particles have a size of 2–5 nm.

4. A suspension as claimed in claim 1, characterized in that the metal particles each comprise a single crystal.

5. A suspension as claimed in claim 1, in which the microemulsion comprises n-hexane, pentaethyleneglycol dodecylether, and water, characterized in that the composition of the microemulsion is represented by the shaded area in any of the ternary diagrams disclosed in the drawing.

6. A method for the manufacture of a liquid suspension of particles of a metal belonging to the platinum group by reducing a metal salt in an aqueous solution, characterized in dissolving the metal salt in a microemulsion, and reducing the dissolved metal salt to the metallic state to thereby provide metal particles of a size which does not deviate from the average by more than about 10%.

7. A method as claimed in claim 6, characterized in dissolving the metal salt in a microemulsion comprising a hydrocarbon, a non-ionic surfactant, and water.

8. A method as claimed in claim 6, characterized in reducing the metal salt with hydrogen or hydrazine.

9. A method as claimed in claim 6, in which acid by-products are formed in the reaction, characterized in giving the microemulsion, before the reduction, such as increased pH that the pH after the reduction is at least 4.

10. A process for preparing a catalyst using the suspension of particles of claim 1, comprising the steps of (1) wetting a carrier with the suspension of particles comprising the microemulsion, and then (2) evaporating the liquid so as to deposit the particles on the carrier.

* * * * *